May 8, 1945.    W. A. SANDBERG    2,375,442
HORIZONTAL TANK AND SUPPORT THEREFOR
Original Filed Jan. 12, 1942    3 Sheets-Sheet 1

WILLIAM A. SANDBERG
INVENTOR

ATTORNEY

May 8, 1945. W. A. SANDBERG 2,375,442
HORIZONTAL TANK AND SUPPORT THEREFOR
Original Filed Jan. 12, 1942 3 Sheets-Sheet 2

WILLIAM A. SANDBERG
INVENTOR

ATTORNEY

May 8, 1945.   W. A. SANDBERG   2,375,442
HORIZONTAL TANK AND SUPPORT THEREFOR
Original Filed Jan. 12, 1942   3 Sheets-Sheet 3

WILLIAM A. SANDBERG
INVENTOR
ATTORNEY

Patented May 8, 1945

2,375,442

UNITED STATES PATENT OFFICE 2,375,442

HORIZONTAL TANK AND SUPPORT THEREFOR

William A. Sandberg, Los Angeles, Calif., assignor to Lacy Manufacturing Company, Los Angeles, Calif., a corporation of California Application November 8, 1943, Serial No. 509,517

10 Claims. (Cl. 220—18)

The instant invention is a modification of and in some respects an improvement over the structure described in my copending application Serial No. 426,393, filed January 12, 1942, and since matured into Patent No. 2,359,683 on October 3, 1944, and is a continuation in part of that application as to common subject matter.

The purpose of the present invention is to provide for the support of a pressure storage tank of great dimensions in such manner as to distribute the weight of the tank and its contents over supports arranged in two or more lateral planes; to permit free longitudinal expansion and contraction of the tank shell, and to avoid any possibility of the application of a bending moment either to the supports or to a localized portion of the tank shell.

In the copending application the tank is suspended at the center of its length on a pair of supports which must be rigid longitudinally but may be more or less resilient laterally. The ends of the tank project freely beyond the plane of support, to equal distances, and by reason of their cylindrical form are equivalent to cantilever trusses. Lateral and tilting movements are prevented by an anchor connecting the bottom of the tank with a foundation block at a point substantially aligned with the axis of the tank and with the supporting columns.

Tanks of great size, up to 20,000 barrels capacity and 4,000 tons live load, have been constructed in this manner, but there is a limit beyond which a free end cannot economically be projected beyond the plane of support. The present invention is directed to a modification which permits the construction of tanks of any desired relation of length to diameter, while retaining all the advantages of the original structure, by suspending them in two or even more lateral planes.

The invention may best be understood with reference to the attached drawings and the following description thereof, in which.

Figure 1:
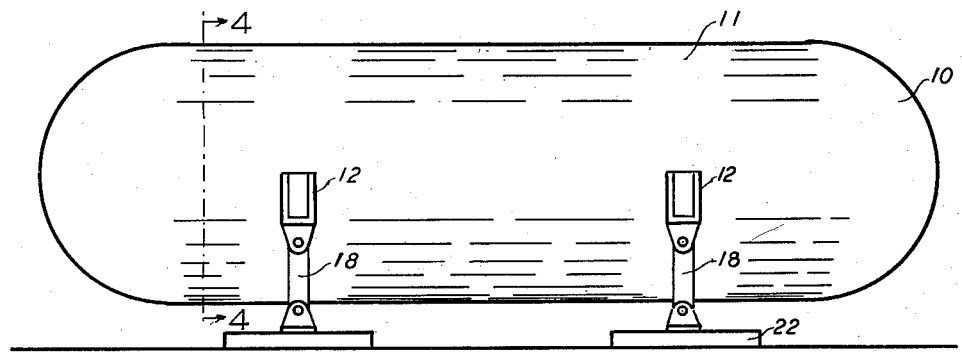
Fig. 1 is a side elevation of the tank in place on its supports.
Figure 2:
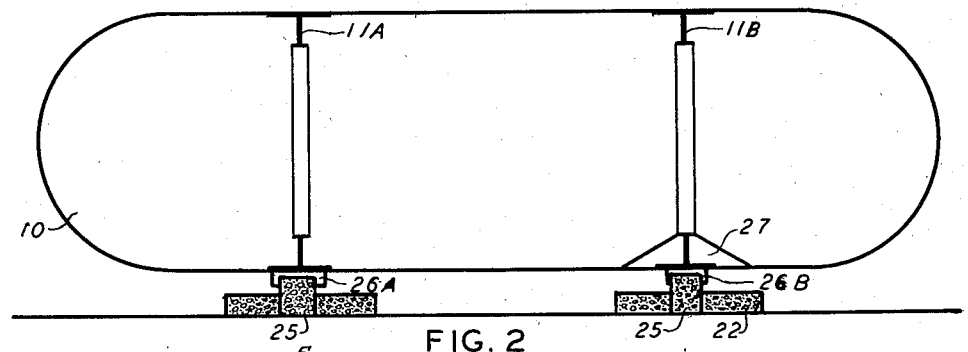
Fig. 2 is a vertical longitudinal section through the tank, indicating the longitudinal position of the anchors.
Figure 3:
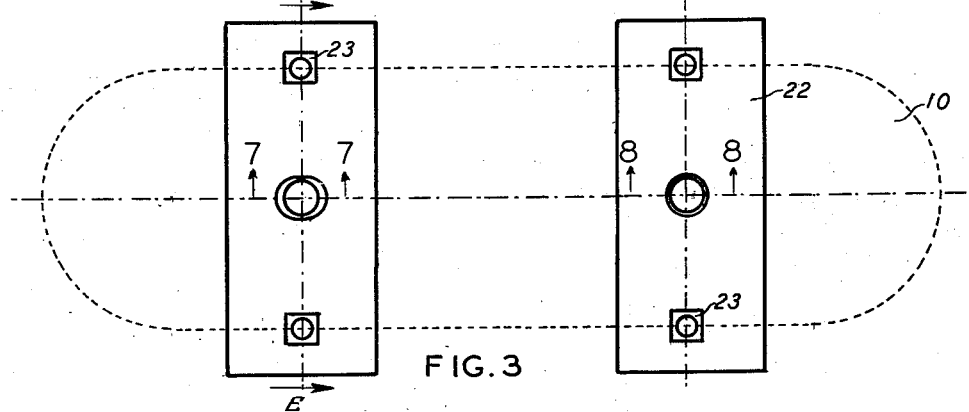
Fig. 3 is a plan view of the foundation indicating the positions of the anchors and the base plates of the supporting columns.
Figure 8:
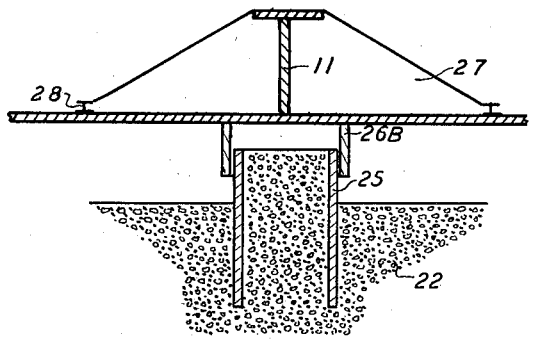
Figure 7:
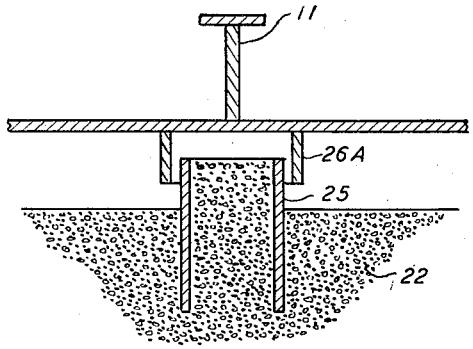
Figure 10:
Figure 9:
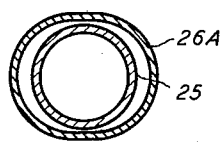

Figs. 7 and 8 are vertical sections through the two anchors 26A and 26B, as on the lines 7—7 and 8—8 of Fig. 3;

Figs. 9 and 10 are plan views of the two anchors; and

Figure 11:
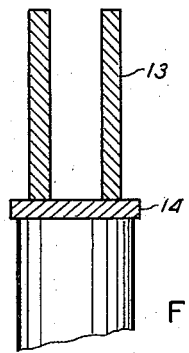
Figure 5:
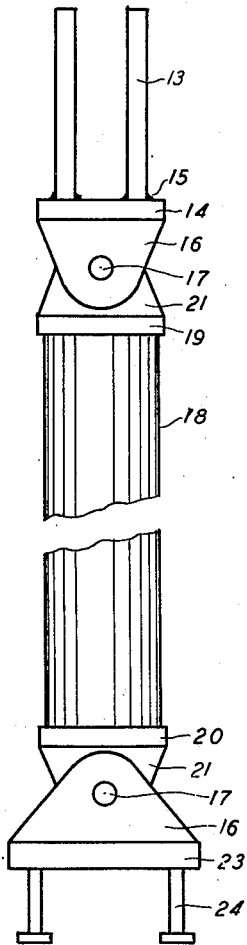
Figs. 5 and 6 are details on an enlarged scale of one of the supporting columns.
Figure 6:
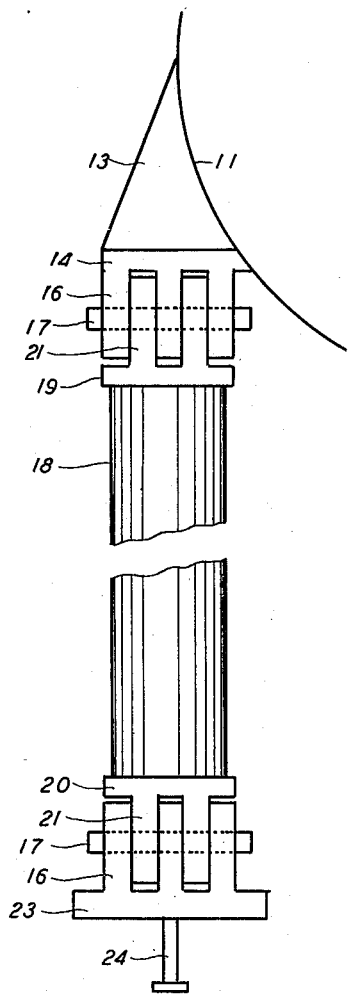

Fig. 11 is a detail of a modified form of supporting column which may, in some locations, be substituted for the form shown in Figs. 5 and 6.

Referring to the drawings, which illustrate the invention as applied to a tank supported in two planes, a horizontal cylindrical tank 10 having hemispherical or otherwise curved heads is provided internally with two girder rings 11A and 11B. These rings are so spaced that the volumetric spaces between the plane of each ring and the adjacent head are equal and that the sum of these spaces is approximately equal to the volumetric space between these two planes. So located, each half of the tank is approximately in balance on its own supports and any bending stress on the shell as a whole, which would follow from unbalanced load, is minimized.

Figure 4:
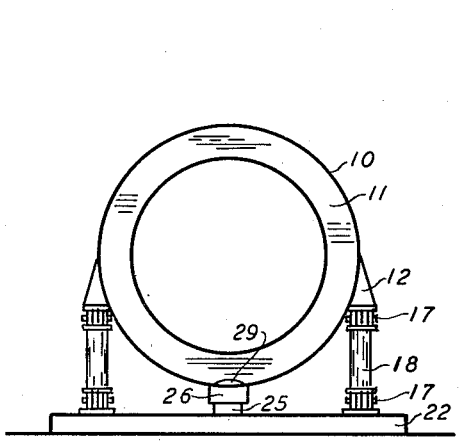
Fig. 4 is a cross section through the tank as on the line 4—4 of Fig. 1.

The girder rings should be of such strength and stiffness as to carry the weight of the tank and its contents, at spaced points, with negligible deformation. Preferably the girder is so formed that its outer flange forms part of the shell of the tank. A drainage opening 29 should be formed at the bottom of the web (Fig. 4).

Externally the tank is provided with four brackets 12—12 centered in the planes of the girder webs and located somewhat below the vertical center line of the tank. These brackets may be of any preferred form but are illustrated (Figs. 5 and 6) as consisting of one or more webs 13 and a base plate 14, both strongly secured to the outer face of the girder and to each other, as at 15. From the base plate a plurality of lugs 16 are projected downwardly and are drilled to a loose fit over a bearing pin 17.

The leg of the supporting column may be a suitable length of I-beam or other structural shape, but is preferably of heavy walled steel pipe as shown at 18, having cap plates 19 and 20 welded to its ends. From the upper cap plate a plurality of lugs 21 are projected upwardly to mesh loosely with the downwardly projected lugs 16 and are also drilled to receive pin 17. When assembled, these meshing lugs and the pin constitute a hinge joint on which the leg 18 may swivel the long way of the tank. Close fitting is not necessary as the hinge may have a slight degree of lateral play to compensate circumferential expansion and contraction of the tank shell.

On a suitable foundation 22 of masonry or concrete are placed base plates 23 which may be retained in position by lugs or bolts 24. The assemblage of meshing lugs 16 and 21 with pin 17 is repeated between cap plate 20 and base plate 23, thus providing a second hinged joint at the lower end of each column leg 18.

The anchors by which undesired horizontal movements of the tank are prevented consist of a cylinder 25 telescoping with a tube 26, one of these elements being at least partially buried in the foundation, the other rigidly affixed to the tank bottom. As illustrated in Figs. 7 and 8 the inner element 25 is fixed in the foundation and projects above it to form a plug while the outer element 26 is welded to the tank bottom at its lower center line and substantially in the line E—E intersecting the base plates 23 (Fig. 3). This arrangement may be inverted if preferred. As indicated in Figs. 3, 7 and 8, one of these tubes (26A) is elongated and has straight sides contacting the perimeter of the corresponding plug, while the other tube (26B) is circular and is a fairly close fit over its plug.

As will be evident, both of these plugs, with their mating tubes, act to prevent any lateral movement of the tank, such as might result from wind pressure or earthquake shock, the columns 18 being in compression only and receiving no lateral stress. Any tendency toward bodily longitudinal movement of the tank is resisted only by the plug and tube 26B, the elongation of tube 26A permitting free expansion and contraction of the shell with temperature changes, the supporting columns at the free end of the tank swivelling through small arcs on pins 17.

As there is no possibility of appreciable longitudinal movement of the fixed end of the tank— the end carrying the circular tube 26B—it is permissible to omit the hinged joints at this end and to substitute the substantially rigid simple column illustrated in Fig. 11. This substitution is not permissible at the end of the tank carrying the elongated tube 26A, as a limited freedom of movement at this end must be provided for. It is, however, entirely in order to modify the structure of the hinge joint in any desired manner, as by the substitution of a knife edge, ball or roller between the plates.

The impact produced by a sharp longitudinal shock may tend to overturn the projecting ring 26B and thus to deform the girder ring from which it is projected. I therefore prefer to reinforce the girder, on the center line of the anchor ring, by longitudinal brackets 27 (Fig. 8) welded to the web and flanges of the girder. These plates may be toed against sections 28 of I-beam secured to the inside of the tank.

While the invention is described as supporting the tank in two planes, it would be possible to support it in three or more, using a single anchor to restrain longitudinal movement and permitting such movement on the remainder. Such divided support would be feasible only when the supporting ground is of such firmness as to avoid any risk of the departure of any one of the foundation blocks from its original level, as such change might impose a destructive bending stress on the shell as a unit. Stresses of this kind are impossible in the support of the tank in two planes, as herein described, or in a single plane, as in the copending application.

Tanks of this type are constructed by placing the girder rings on the foundations in an erect position and attaching plates to the ends of the rings until the halves meet and can be joined. In this process, plates are added to the two ends of each ring in such manner as to maintain them approximately in balance at all times and avoid any excessive tendency to overturn. The rings may conveniently be mounted on temporary rollers to permit revolution for downhand welding. A full description of a preferred manner of erection may be found in the disclosure of the copending application.

I claim as my invention:

1. In combination: a horizontal cylindrical tank; circumferentially rigid girders longitudinally spaced within said tank; a foundation block beneath each said girder; a pair of oppositely disposed brackets mounted on the exterior of said tank in the plane of each said girder; columns each transmitting part of the weight of said tank to said foundation, the columns of at least one pair being provided at their ends with swivelling joints permitting said columns to swivel longitudinally on said brackets and on said foundation; an anchor consisting of a telescoping plug and ring arranged between the bottom of said tank and said foundation block to prevent any material horizontal motion of one end of said tank as regards said foundation, and an anchor consisting of a plug telescoping in a longitudinally elongated ring arranged between the bottom of said tank and said foundation block to prevent lateral motion and permit longitudinal motion of the opposite end of said tank.

2. Structure substantially as defined in claim 1, in which said anchors are located substantially between oppositely disposed columns.

3. Structure substantially as defined in claim 1, in which said girders are so spaced that the volumetric spaces between the plane of each girder and the adjacent end of said tank are substantially equal and the sum of such spaces is approximately equal to the volumetric space between said planes.

4. Means for supporting a horizontally disposed tank, comprising: a foundation; a pair of vertical columns resting on said foundation and supporting one end of said tank at opposite points on its circumference; an anchor arranged to prevent any material horizontal movement of the end of said tank supported by said columns; a second pair of columns supporting the opposite end of said tank, the columns of said second pair being capable of movement in a plane parallel to the longitudinal axis of said tank, and an anchor located between the columns of said second pair and arranged to prevent lateral movement and to permit longitudinal movement of said opposite end of said tank.

5. Structure substantially as defined in claim 4, in which the columns capable of longitudinal movement are provided with swivelling joints adjacent their upper and their lower ends.

6. In a support for a horizontally disposed tank: two pairs of oppositely disposed columns supporting opposite ends of said tank, at least one of said pairs being hinged top and bottom to swivel in planes parallel to the longitudinal axis of said tank; an anchor arranged to restrain one end of said tank against any material horizontal movement, and means arranged to permit the other end of said tank to travel horizontally in only a longitudinal direction.

7. In a support for a horizontally disposed tank: a pair of vertical columns supporting one end of said tank and means for preventing horizontal movement of said end in any direction; a pair of columns supporting the opposite end of said tank, last said columns being hinged top and bottom to swivel in planes parallel to the longitudinal axis of said tank, and means for restricting horizontal movement of said opposite end to a longitudinal direction.

8. In a support for a horizontally disposed tank: means for supporting one end of said tank and for substantially preventing horizontal movement thereof; a pair of columns supporting the opposite end of said tank, said columns being hinged top and bottom to swivel in planes parallel to the longitudinal axis of said tank, and means for restricting horizontal movement of said opposite end to a longitudinal direction.

9. Means for supporting a horizontally disposed tank, comprising: a foundation; two pairs of vertical columns resting on said foundation and supporting the ends of said tank, the columns of each pair being oppositely disposed on the circumference of said tank and all of said columns being capable of movement in a plane parallel to the longitudinal axis of said tank, and an anchor located between the columns of each said pair arranged to prevent lateral movement and to permit limited longitudinal movement of said tank as regards said foundation.

10. Means for supporting a horizontally disposed tank, comprising: a foundation; a pair of vertical columns resting on said foundation and supporting one end of said tank at opposite points on its circumference, said columns being rigidly fixed in said foundation to prevent any material horizontal movement of the end of said tank supported by said columns; a second pair of columns supporting the opposite end of said tank, the columns of said second pair being capable of movement in a plane parallel to the longitudinal axis of said tank, and an anchor located between the columns of said second pair and arranged to prevent lateral movement and to permit longitudinal movement of said opposite end of said tank.

WILLIAM A. SANDBERG.